United States Patent [19]

Mizuhara

[11] Patent Number: 4,801,066
[45] Date of Patent: Jan. 31, 1989

[54] SLOTTED BRAZING ALLOY STRIP

[75] Inventor: Howard Mizuhara, Hillsborough, Calif.

[73] Assignee: GTE Products Corporation, Stamford, Conn.

[21] Appl. No.: 176,566

[22] Filed: Apr. 1, 1988

[51] Int. Cl.⁴ .............................................. B23K 3/00
[52] U.S. Cl. .................................................. 228/56.3
[58] Field of Search ........................................ 228/56.3

[56] References Cited

U.S. PATENT DOCUMENTS

| | | | |
|---|---|---|---|
| 3,056,195 | 10/1962 | Hack | 228/56.3 |
| 3,221,970 | 12/1965 | Lockshin | 228/56.3 |
| 3,439,859 | 4/1969 | Filson | 228/56.3 |
| 4,491,265 | 1/1985 | Ittner et al. | 228/56.3 |

Primary Examiner—M. Jordan
Attorney, Agent, or Firm—James Theodosopoulos

[57] ABSTRACT

An L-shaped brazing alloy strip comprises a plurality of angled ear portions connected to a long continuous leg portion, with angular gaps between the ear portions. When the strip is bent into a circular shape, adjacent ear portions abut each other, with substantially no gap therebetween.

3 Claims, 2 Drawing Sheets

SLOTTED BRAZING ALLOY STRIP

This invention concerns L-shaped slotted brazing alloy strips of the type disclosed in U.S. Pat. Nos. 3,056,195 and 4,589,601. Such strips can be formed into, for example, a circular shape in order to, say, braze the ends of two cylinders together. In the process of bending a straight strip into a circular shape, the slots open up, as shown in FIG. 2 of 3,056,195. This can leave undesirable gaps in the braze area between two parts to be brazed together if the braze alloy does not flow during the brazing operation. This invention solves the problem.

In this invention, the slots are angled so that when the strip is bent into a circular shape, there are substantially no gaps in the slot area. A slotted brazing alloy strip as per this invention comprises a plurality of angled ear portions connected to a long continuous leg portion, the leg portion being at right angles to the ear portions, with angular slots between the ear portions creating an angular gap between adjacent ear portions, the angle of the slots being predetermined to abut adjacent ear portions to each other with substantially no gap therebetween when the alloy strip is bent into a circular shape.

Figure 1:
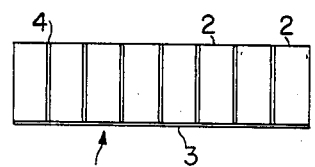
FIGS. 1 & 2 show a straight prior art slotted strip and FIG. 3 shows the gaps when the strip is bent into a circle.
Figure 2:
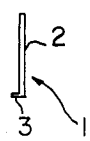
Figure 3:
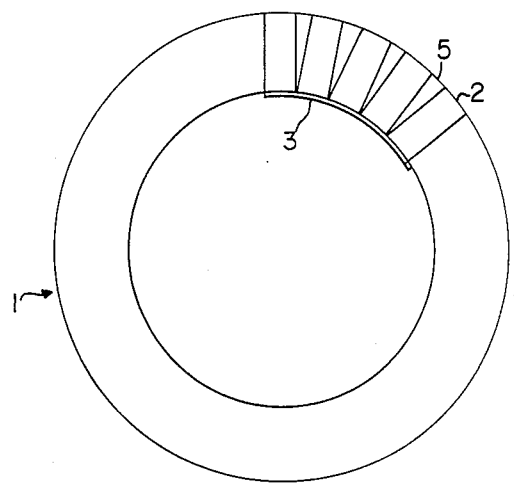

In FIGS. 1 and 2, prior art brazing alloy strip 1 comprises ear portions 2, a leg portion 3 and slits 4 between ear portions 2. FIG. 3 shows gaps 5 in the slit area between ear portions 2 when strip 1 is bent into a circular shape.

Figure 5:
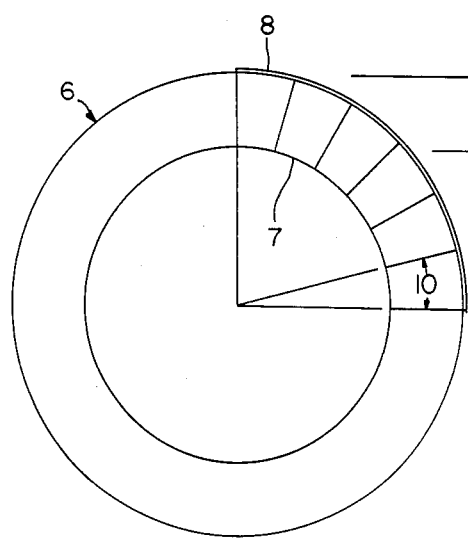
FIG. 4 shows a straight slotted strip as per this invention and FIG. 5 shows the strip bent into a circle.
Figure 4:
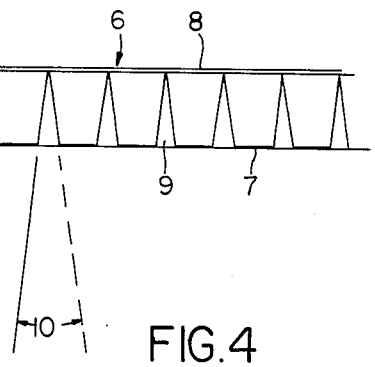
Figure 6:
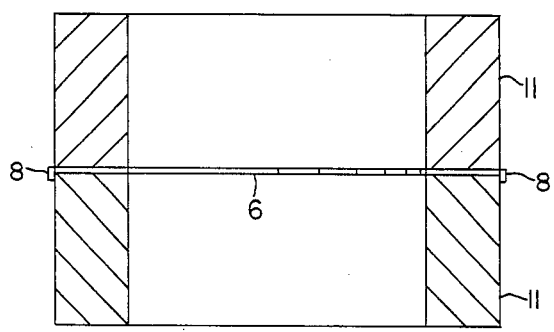
FIG. 6 is a cross sectional view of the circular strip in position between two cylindrical objects to be brazed together.

An alloy strip 6 as per this invention, as shown in FIGS. 4 and 5, comprises ear portions 7, a leg portion 8 and angled slots 9 between ear portions 7. Angle 10 of slots 9 is determined by the total number of ear portions 7 that are in strip 6 in the circular shape shown in FIG. 5. Angle 10 is calculated by dividing 360° by said total number. For example, if the total number of ear portions 7 is twenty-four, then angle 10 equals fifteen degrees. Of course, when strip 6 is bent into the circular shape shown in FIG. 5, leg portion 8 is located at the outer circumference of the circle. This is also shown in FIG. 6, where strip 6 is disposed between two cylinders 11, which can be metal and/or ceramic, for brazing.

Figure 7:
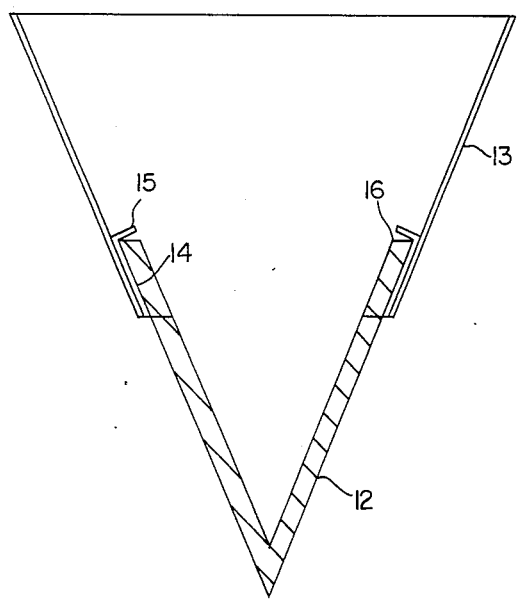
FIG. 7 shows a strip bent into position for brazing a conical object to a truncated conical object.

In FIG. 7, a ceramic cone 12 is brazed to a truncated metal core 13 by means of a brazing alloy strip 14. Leg portion 15 of strip 14 extends inward on upper edge 16 of cone 12. In this example strip 14 was made of 2 mil thick Cusil ABA and was 6¼" long by 0.55" wide. Cusil ABA is a trade name of Wesgo Division of GTE Products Corporation for an active metal brazing alloy of 35% copper, 2% titanium, balance silver. In this example, the angle in the slots is calculated differently and is dependent on the difference in the circumference at the upper edge of strip 14, where leg portion 15 is located, and the circumference at the bottom of strip 14. In this example, these circumferences are, respectively, 6.25" and 4.86". There were twenty-five ear portions and the slot angle was 5.6°.

I claim:

1. A slotted brazing alloy strip comprising a plurality of angled ear portions connected to a long continuous leg portion, the leg portion being at right angles to the ear portions, with angular slots between the ear portions creating angular gap between adjacent ear portions, the angle of the slots being predetermined to abut adjacent ear portions to each other with substantially no gap therebetween when the alloy strip is bent into a circular shape.

2. The method of brazing two cylindrical objects together comprising the step of bending the alloy strip of claim 1 into a circular shape, disposing the circular strip between the ends of two cylindrical objects and brazing the objects together.

3. The method of brazing a first conical object having a circular upper edge to a truncated conical object comprising the steps of disposing the alloy strip of claim 1 around the upper end of the conical object so that the leg portion of the alloy strip extends inward on the upper edge of the first conical object, disposing the truncated conical object on and over the first conical object with the ear potions of the alloy strip therebetween, and brazing the two conical objects together.

* * * * *